United States Patent
Fahland et al.

(10) Patent No.: US 10,625,791 B2
(45) Date of Patent: Apr. 21, 2020

(54) ADJUSTABLE SPLITTER SYSTEM FOR A MOTOR VEHICLE

(71) Applicant: GM Global Technology Operations LLC, Detroit, MI (US)

(72) Inventors: Jason D. Fahland, Fenton, MI (US); Joshua R. Auden, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 51 days.

(21) Appl. No.: 15/714,510

(22) Filed: Sep. 25, 2017

(65) Prior Publication Data

US 2019/0092402 A1    Mar. 28, 2019

(51) Int. Cl.
| | |
|---|---|
| *B62D 35/00* | (2006.01) |
| *B60W 30/02* | (2012.01) |
| *B62D 37/02* | (2006.01) |
| *B62D 35/02* | (2006.01) |

(52) U.S. Cl.
CPC ........... *B62D 35/005* (2013.01); *B60W 30/02* (2013.01); *B62D 37/02* (2013.01); *B60W 2520/14* (2013.01); *B60W 2520/28* (2013.01); *B60W 2530/16* (2013.01); *B60W 2710/30* (2013.01); *B60Y 2306/09* (2013.01); *B62D 35/02* (2013.01)

(58) Field of Classification Search
None
See application file for complete search history.

(56) References Cited

U.S. PATENT DOCUMENTS

| | | | | |
|---|---|---|---|---|
| 4,810,022 A * | 3/1989 | Takagi | ................. | B62D 35/005 296/180.5 |
| 8,210,600 B1 * | 7/2012 | Verhee | ................. | B62D 35/005 296/180.1 |
| 8,702,152 B1 * | 4/2014 | Platto | ................... | B62D 35/005 296/180.1 |
| 9,333,994 B1 * | 5/2016 | Fahland | ............... | B62D 35/007 |
| 9,469,354 B1 * | 10/2016 | Ciccone | ............... | B62D 35/005 |
| 2009/0056612 A1 * | 3/2009 | Yap | ........................ | B63B 1/322 114/273 |
| 2009/0115221 A1 * | 5/2009 | Shinedling | ........... | B62D 35/005 296/180.5 |
| 2010/0140976 A1 * | 6/2010 | Browne | ............... | B62D 35/005 296/180.1 |
| 2015/0149046 A1 * | 5/2015 | Jeong | ..................... | G01G 19/12 701/49 |

(Continued)

*Primary Examiner* — Todd M Melton
*Assistant Examiner* — Jason R Roberson
(74) *Attorney, Agent, or Firm* — Quinn IP Law

(57) ABSTRACT

A splitter system for a vehicle having a vehicle body including a first vehicle body end configured to face oncoming ambient airflow when the vehicle is in motion includes first and second splitter portions. The first splitter portion is configured to be fixed to the vehicle body. The second splitter portion is mounted to the first splitter portion. The first and second splitter portions together are configured to generate an aerodynamic downforce on the vehicle body when the vehicle is in motion. The splitter system also includes a mechanism arranged between the first and second splitter portions. The mechanism is configured to vary position of the second splitter portion relative to the first splitter portion to thereby control movement of the oncoming ambient airflow relative to the vehicle body and vary a magnitude of the aerodynamic downforce.

18 Claims, 2 Drawing Sheets

(56) References Cited

U.S. PATENT DOCUMENTS

| | | | |
|---|---|---|---|
| 2015/0210319 A1* | 7/2015 | Tiramani | B62D 21/183 |
| | | | 280/756 |
| 2015/0225026 A1* | 8/2015 | Ohira | B62D 25/08 |
| | | | 296/180.1 |
| 2015/0232138 A1* | 8/2015 | Parry-Williams | B62D 37/02 |
| | | | 296/180.5 |
| 2017/0240225 A1* | 8/2017 | Gaylard | B60K 11/06 |

* cited by examiner

ADJUSTABLE SPLITTER SYSTEM FOR A MOTOR VEHICLE

INTRODUCTION

The disclosure relates to an adjustable splitter system for enhancement of aerodynamics of a motor vehicle.

Aerodynamics is a significant factor in vehicle design, including automobiles. Automotive aerodynamics is the study of the aerodynamics of road vehicles. The main goals of the study are to reduce drag and wind noise, minimize noise emission, and prevent undesired lift forces and other causes of aerodynamic instability at high speeds. Additionally, the study of aerodynamics may also be used to achieve downforce in high-performance vehicles in order to improve vehicle traction and cornering abilities. The study is typically used to shape vehicle bodywork for achieving a desired compromise among the above characteristics for specific vehicle use.

A splitter is an aerodynamic device sometimes used to increase the amount of downforce at the front of the car. Typically, the airstream is brought to stagnation at the front of the vehicle above the splitter by an air dam, causing an area of high pressure. Below the splitter, the airstream is redirected away from the stagnation zone and is accelerated, causing the pressure to drop. Thus reduced, the pressure below the splitter combined with the high pressure above the splitter, creates downforce at the front end of the vehicle body. Generally, the larger the area is of the splitter, the more downforce is generated at the front of the vehicle.

SUMMARY

A splitter system for a vehicle having a vehicle body arranged in a body plane along a longitudinal body axis and including a first vehicle body end configured to face oncoming ambient airflow when the vehicle is in motion relative to a road surface includes a first splitter portion and a second splitter portion. The first splitter portion is configured to be fixedly mounted to the vehicle body and includes a first splitter portion axis arranged parallel to the body plane and perpendicular to the longitudinal body axis. The second splitter portion is mounted to the first splitter portion. The first splitter portion and the second splitter portion together are configured to generate an aerodynamic downforce on the vehicle body when the vehicle is in motion. The splitter system also includes a mechanism arranged between the first splitter portion and the second splitter portion. The mechanism is configured to vary position of the second splitter portion relative to the first splitter portion to thereby control movement of the oncoming ambient airflow relative to the vehicle body and vary a magnitude of the aerodynamic downforce.

The splitter system may also include an electronic controller configured to regulate the mechanism.

The vehicle may additionally include a road wheel. The splitter system may also include a first sensor configured to detect a rotating speed of the road wheel and communicate the detected rotating speed of the road wheel to the controller.

The splitter system may also include a second sensor configured to detect a yaw rate of the vehicle body and communicate the detected yaw rate to the controller The splitter system may additionally include a third sensor configured to detect a velocity of ambient airflow relative to the vehicle and communicate the detected velocity of the ambient airflow to the controller.

The second splitter portion may include a second splitter portion axis. The mechanism may be additionally configured to rotate the second splitter portion relative to the first splitter portion, to thereby selectively vary an angle of the second splitter portion axis relative to the longitudinal body axis to thereby adjust the magnitude of the aerodynamic downforce on the vehicle body.

The controller may be configured to vary the angle of the second splitter portion axis relative to the longitudinal body axis via the mechanism during vehicle cornering in response to the detected yaw rate and at least one of the detected rotating speed of the road wheel and velocity of the ambient airflow to thereby adjust the magnitude of the aerodynamic downforce on the vehicle body and control the detected yaw rate.

The controller may be configured to separate the second splitter portion from the first splitter portion by a distance via the mechanism. Furthermore, the mechanism may be configured to selectively shift the second splitter portion relative to the first splitter portion in a direction transverse to the longitudinal body axis to thereby adjust the magnitude of the aerodynamic downforce generated by the splitter on the vehicle body.

The mechanism may also include at least one stanchion moveably connecting the second splitter portion to the first splitter portion.

The mechanism may additionally include at least one of a linear actuator and an electric motor.

The vehicle body may include a second vehicle body end opposite of the first end, and the at least one stanchion may connect the wing-shaped body to the vehicle body at the first vehicle body end or at the second vehicle body end.

At least one of the first splitter portion and the second splitter portion may have a wing-shaped body arranged along the splitter axis.

A motor vehicle having such a splitter system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
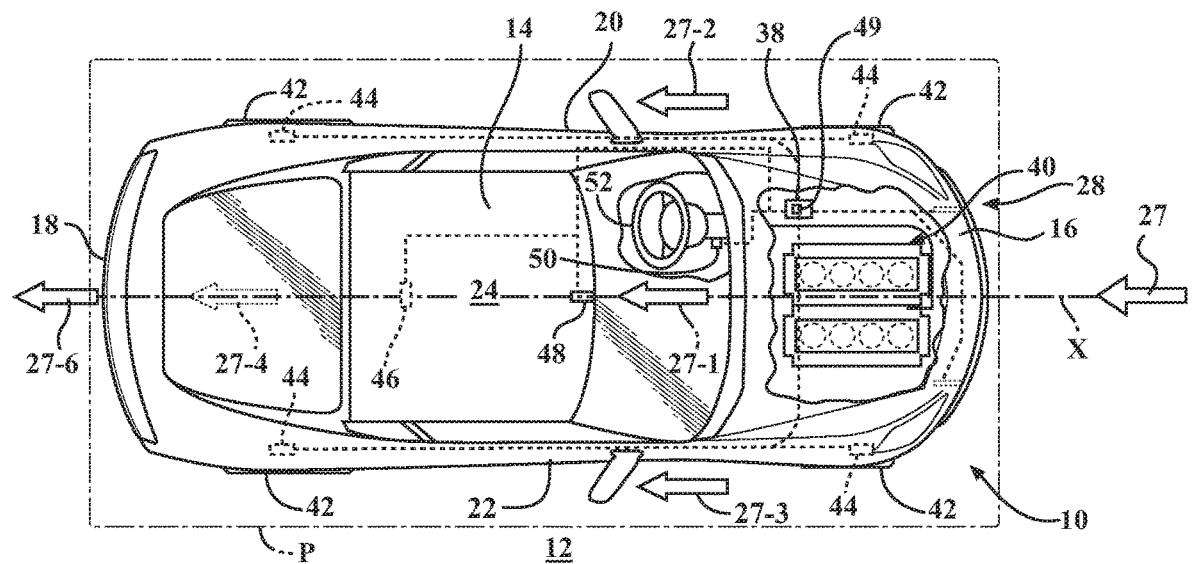
FIG. 1 is a schematic top view of a vehicle having a vehicle body arranged in a body plane along a longitudinal axis, and having a splitter system according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion 26 (shown in FIG. 2).

The left side 20 and right side 22 are disposed generally parallel to each other and with respect to a virtual longitudinal vehicle body axis X of the vehicle 10, and span the distance between the front end 16 and the rear end 18. The body plane P is defined to include the longitudinal vehicle body axis X. A passenger compartment (not shown) of the vehicle 10 is generally bounded by the front and rear ends 16, 18 and the left and right sides 20, 22 of the body 14. As understood by those skilled in the art, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal vehicle body axis X.

As the vehicle 10 moves relative to the road surface 12, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in FIG. 2) passes under the vehicle body 14, between the underbody portion 26 and the road surface 12. As understood by those skilled in the art, the recirculating airflow region 27-6 is generally caused at elevated vehicle speeds by the flow of surrounding air around the six body sides of the vehicle body 14.

Figure 2:
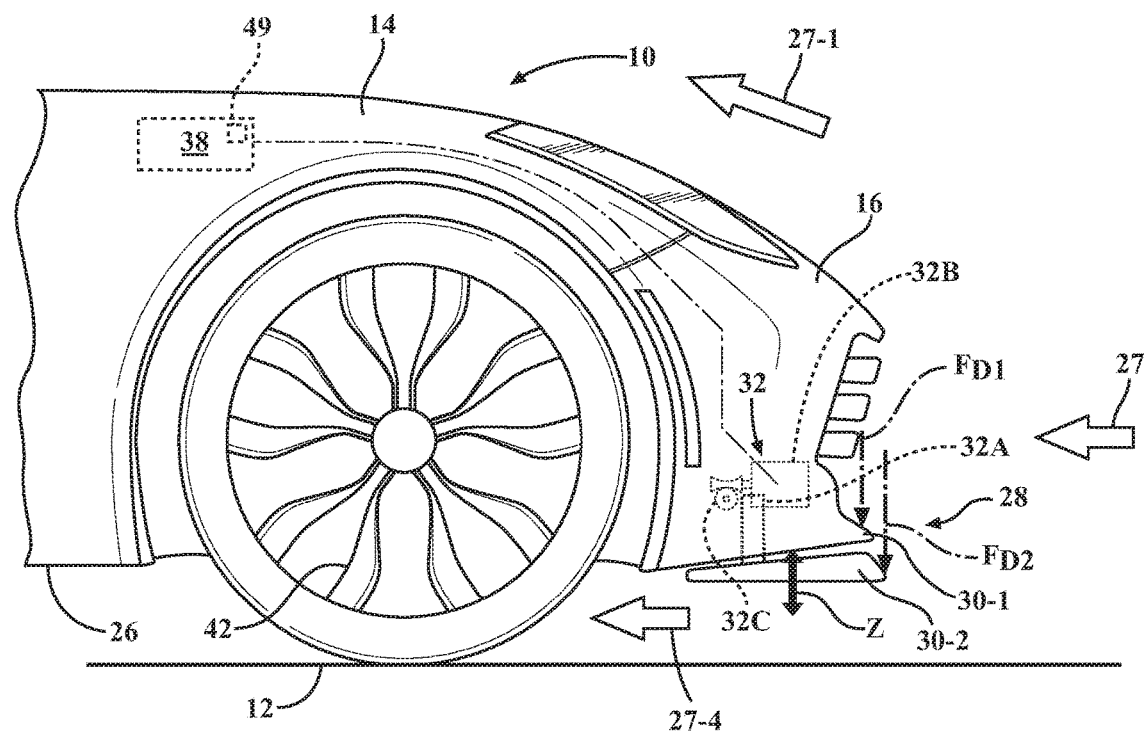
FIG. 2 is a schematic partial side view of the vehicle having the splitter system shown in FIG. 1.
Figure 3:
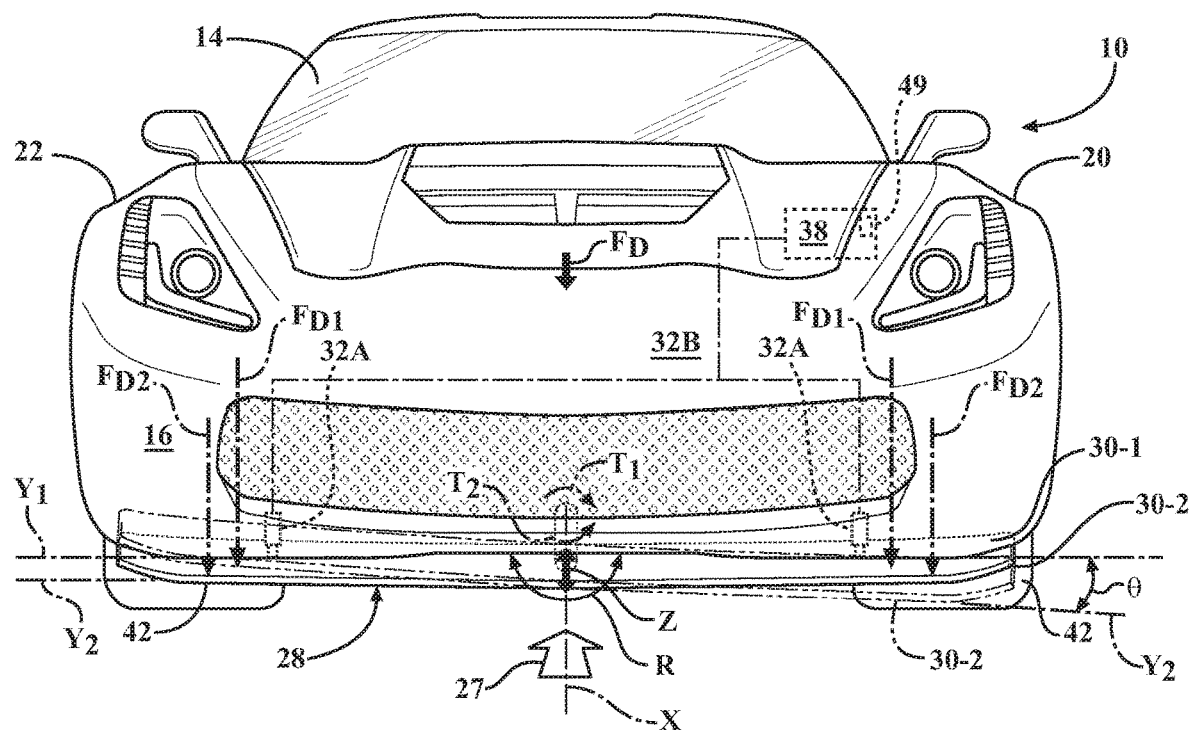
FIG. 3 is a schematic front view of the vehicle having the splitter system shown in FIGS. 1 and 2.

As shown in FIGS. 1-3, the vehicle 10 also includes a splitter system 28. As shown in FIGS. 2 and 3, the splitter system 28 includes a first splitter portion 30-1 configured to be fixedly mounted to the vehicle body 14 and includes a first splitter portion axis Y1 arranged parallel to the body plane P and substantially perpendicular to the longitudinal vehicle body axis X. The splitter system 28 also includes a second splitter portion 30-2 having a second splitter portion axis Y2. The second splitter portion 30-2 is moveably mounted to the first splitter portion 30-1. Together, the first splitter portion 30-1 and the second splitter portion 30-2 are configured to generate an aerodynamic downforce $F_D$ on the front end 16 of the vehicle body 14 using the ambient airflow 27 when the vehicle 10 is in motion.

Each of the first splitter portion 30-1 and the second splitter portion 30-2 may have a wing-shaped cross-section arranged transversely to the respective first and second splitter portion axes Y1 and Y2 and configured to control a movement of the ambient airflow 27 relative to the longitudinal vehicle body axis X. "Wing-shaped" is herein defined as a fin having an airfoil shape, or a streamlined cross-sectional shape producing lift for flight or propulsion through a fluid.

As shown in FIGS. 2-3, the splitter system 28 also includes a mechanism 32 arranged between the first splitter portion 30-1 and the second splitter portion 30-2. The mechanism 32 is configured to vary position of the second splitter portion 30-2 relative to the first splitter portion 30-1 to thereby control movement of the oncoming ambient airflow 27 relative to the vehicle body 14 and vary the magnitude of the aerodynamic downforce $F_D$ when the vehicle 10 is in motion. Specifically, the mechanism 32 may be configured to selectively shift the second splitter portion 30-2 relative to the first splitter portion 30-1 in a direction Z transverse to the longitudinal vehicle body axis X and thereby separate the second splitter portion 30-2 from the first splitter portion 30-1. Such separation of the second splitter portion 30-2 from the first splitter portion 30-1 is intended to adjust a magnitude of the total aerodynamic downforce $F_D$ generated by the splitter system 28 on the vehicle body 14. Additionally, the mechanism 32 may be configured to rotate the second splitter portion 30-2 relative to the first splitter portion 30-1, as identified in FIG. 3 via letter R, and thereby selectively vary angle θ of the second splitter portion axis Y2 relative to the longitudinal vehicle body axis X. Such rotation of the second splitter portion 30-2 relative to the first splitter portion 30-1 is intended to further adjust the magnitude of the aerodynamic downforce $F_D$ on the front end 16 of the vehicle body 14.

The splitter system 28 may include one or more stanchions 34 moveably connecting the second splitter portion 30-2 to the first splitter portion 30-1. The mechanism 32 may either be positioned between the first splitter portion 30-1 and the stanchion 34 or between the stanchion and the second splitter portion 30-2. As shown in FIG. 2, the mechanism 32 may include a suitable device for generating movement of the second splitter portion 30-2, such as one or more linear actuators 32A and/or an electric motor 32B. The mechanism 32 may also include a gear drive, such as a reduction gear-set 32C, which may be coupled to the device, such as the linear actuator 32A or electric motor 32B, in order to effect desired movement, including the separation from and rotation of the second splitter portion 30-2 relative to the first splitter portion 30-1. When the second splitter portion 30-2 is separated from and shifted relative to the first splitter portion 30-1 in a direction transverse to the longitudinal vehicle body axis X, the first splitter portion will generate a first portion $F_{D1}$ of the aerodynamic downforce $F_D$, while the second splitter portion will generate a second portion $F_{D2}$ of the subject aerodynamic downforce. As shown in FIG. 3, the mechanism 32 may also be configured to apply a torque T1 to rotate the second splitter portion 30-2 in one direction and an opposite torque T2 to rotate the second splitter portion in the opposite direction.

As shown in FIGS. 1-3, the vehicle 10 also includes an electronic controller 38 configured, i.e., constructed and programmed, to regulate the mechanism 32. The controller 38 may be configured as a central processing unit (CPU) configured to regulate operation of an internal combustion engine 40 (shown in FIG. 1), a hybrid-electric powertrain (not shown), or other alternative types of powerplants, as well as other vehicle 10 systems, or a dedicated controller. In order to appropriately control operation of the mechanism 32, the controller 38 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 38 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 38 may also include a flexible disk, hard disk, magnetic tape, any other magnetic medium, a CD-ROM, DVD, any other optical medium, etc. The controller 38 may be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 38 or accessible thereby may be stored in the memory and automatically executed to provide the required functionality.

As shown in FIGS. 1-3, the vehicle 10 also includes road wheels 42. A plurality of first sensors 44 (shown in FIG. 1) may be arranged on the vehicle body 14 for detecting rotating speeds of each road wheel 42. Each first sensor 44 may also be configured to communicate the detected rotating speed of the respective road wheel 42 to the controller 38, while the controller may be configured to correlate the data received from the respective first sensors to road speed of the vehicle 10. The vehicle 10 may also include a second sensor 46 (shown in FIG. 1) configured to detect a yaw moment or rate on the vehicle body 14 relative to the road surface 12 and communicate the detected yaw rate to the controller 38. The vehicle 10 may additionally include a third sensor 48 (shown in FIG. 1) configured to detect a velocity of ambient airflow 27 relative to the vehicle 10 and communicate the detected velocity of the ambient airflow 27 to the controller 38. The third sensor 48 may be a pitot tube configured to detect a pressure of the ambient airflow 27 at a specific location relative to the vehicle body 14, and the controller 38 may correlate the measured pressure to airflow 27 velocity.

As shown in FIG. 3, the controller 38 may be configured to vary the angle θ of the second splitter portion axis Y2 relative to the longitudinal vehicle body axis X via the mechanism 32 during vehicle 10 cornering. Specifically, the angle θ of the second splitter portion axis Y2 may be varied relative to the longitudinal vehicle body axis X via the mechanism 32 with the aid of the sensors 44, 46, and 48 during cornering of the vehicle 10 in response to the detected yaw rate. In other words, the controller 38 is configured to control the yaw rate detected by the second sensor 46 and the rotating speed of the road wheel(s) 42 detected by the first sensor(s) 44 and/or the velocity of the ambient airflow 27 detected by the third sensor 48 to thereby adjust the magnitude of the aerodynamic downforce $F_D$ on the vehicle body 14 and control the detected yaw rate. Accordingly, the angle θ of the second splitter portion axis Y2 may be controlled relative to the longitudinal vehicle body axis X proportionately to the yaw rate generated during cornering of the vehicle 10 by turning the second splitter portion 30-2 relative to the first splitter portion 30-1. The controller 38 may be programmed with a look-up table 49 establishing correspondence between the vehicle 10 yaw rate, vehicle 10 road speed, and/or velocity of the airflow and appropriate angle θ of the second splitter portion axis Y2 for affecting appropriate regulation of the mechanism 32. The look-up table 49 may be developed empirically during validation and testing of the vehicle 10. As the angle θ of the second splitter portion axis Y2 is varied during the cornering event, the splitter system 28 is able to use the ambient airflow 27 more effectively to maximize the downforce $F_D$ at the front end 16 of the vehicle body 14.

The controller 38 may be additionally programmed to determine a slip of the vehicle 10 relative to the road surface 12. The slip of the vehicle 10 may include a measure of how much each of the road wheels 42 has slipped in a direction that is generally perpendicular to the longitudinal vehicle body axis X, which identifies that the vehicle has deviated from an intended direction or path along the road surface 12. The intended direction of the vehicle 10 may be identified by an angle of a steering wheel 52 (shown in FIG. 1) employed by the vehicle 10. The steering wheel 52 angle may be detected by a fourth sensor 50 operatively connected to the steering wheel and communicated to the controller 38. Furthermore, the controller 38 may be programmed to compare the determined steering wheel 52 angle and yaw rate to determine how much the vehicle 10 has deviated from its intended direction or path.

The controller 38 may also be programmed to control the slip of the vehicle 10 relative to the road surface 12 by controlling rotation of the second splitter portion axis Y2 via the mechanism 32 in response to how much the vehicle 10 has deviated from its intended path. The employed rotation of the second splitter portion axis Y2 then urges the vehicle 10 to return to the actual vehicle heading to the desired heading being commanded by an operator of the vehicle 10 at the steering wheel 52. Additionally, although not shown, two third sensors 48 may be arranged on the second splitter portion 30-2, one proximate to the left side and one proximate to the right side of the second splitter portion. The controller 38 may then be configured to vary the angle θ of the second splitter portion axis Y2 relative to the longitudinal vehicle body axis X in response to a determined differential between airflow 27 velocity measurements at each third sensor 48 as the vehicle 10 enters and negotiates a turn to vary the downforce $F_D$ on the vehicle body 14.

Accordingly, control of the rotation of the second splitter portion axis Y2 may be employed to maintain contact of the vehicle 10 with the road surface 12 at elevated speeds by countering aerodynamic lift of the vehicle body 14 in response to the velocity of ambient airflow 27 detected by the third sensor 48. Additionally, control of the rotation of the second splitter portion 30-2 may be employed to aid handling of the vehicle 10 in order to maintain the vehicle 10 on its intended path by countering the yaw moment acting on the vehicle body 14 as detected by the second sensor 46.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A splitter system for a vehicle having a vehicle body arranged in a body plane along a longitudinal body axis and including a first vehicle body end configured to face oncoming ambient airflow when the vehicle is in motion relative to a road surface, the splitter system comprising:

a first splitter portion configured to be fixedly mounted to the vehicle body and including a first splitter portion axis arranged perpendicular to the longitudinal body axis;

a second splitter portion mounted relative to the first splitter portion, wherein the first splitter portion and the second splitter portion together are configured to generate an aerodynamic downforce on the vehicle body when the vehicle is in motion; and a mechanism arranged between the first splitter portion and the second splitter portion and configured to vary a position of the second splitter portion relative to the first splitter portion to thereby control a movement of the oncoming ambient airflow relative to the vehicle body and vary a magnitude of the aerodynamic downforce;

wherein:

the first splitter portion generates a first portion of the aerodynamic downforce;

the second splitter portion is mounted adjacent to the first splitter portion in the oncoming ambient airflow to generate a second portion of the aerodynamic downforce; and the mechanism is configured to selectively shift the second splitter portion relative to the first splitter portion in a direction transverse to the longitudinal vehicle body axis and thereby separate the second splitter portion from the first splitter portion and adjust the magnitude of the aerodynamic downforce generated by the splitter on the vehicle body.

2. The splitter system according to claim 1, further comprising an electronic controller configured to regulate the mechanism.

3. The splitter system according to claim 2, wherein the vehicle additionally includes a road wheel, and wherein the splitter system further comprises a first sensor configured to detect a rotating speed of the road wheel and communicate the detected rotating speed of the road wheel to the controller.

4. The splitter system according to claim 3, further comprising a second sensor configured to detect a yaw rate of the vehicle body and communicate the detected yaw rate to the controller.

5. The splitter system according to claim 4, further comprising a third sensor configured to detect a velocity of ambient airflow relative to the vehicle and communicate the detected velocity of the ambient airflow to the controller.

6. The splitter system according to claim 5, wherein the second splitter portion includes a second splitter portion axis, and wherein the mechanism is configured to rotate the second splitter portion relative to the first splitter portion, to thereby selectively vary an angle of the second splitter portion axis relative to the longitudinal body axis to thereby adjust the magnitude of the aerodynamic downforce on the vehicle body.

7. The splitter system according to claim 6, wherein the controller is configured to vary the angle of the second splitter portion axis relative to the longitudinal body axis via the mechanism during vehicle cornering in response to the detected yaw rate and at least one of the detected rotating speed of the road wheel and velocity of the ambient airflow to thereby adjust the magnitude of the aerodynamic downforce on the vehicle body and control the detected yaw rate.

8. The splitter system according to claim 1, wherein the second splitter portion is mounted to the first splitter portion, and the mechanism includes at least one stanchion moveably connecting the second splitter portion to the first splitter portion.

9. The splitter system according to claim 1, wherein the mechanism includes at least one of a linear actuator and an electric motor.

10. A motor vehicle comprising:

a vehicle body arranged in a body plane along a longitudinal body axis and including a first vehicle body end configured to face oncoming ambient airflow when the vehicle is in motion relative to a road surface; and a splitter system comprising:

a first splitter portion fixedly mounted to the vehicle body and including a first splitter portion axis arranged perpendicular to the longitudinal body axis;

a second splitter portion mounted relative to the first splitter portion, wherein the first splitter portion and the second splitter portion together are configured to generate an aerodynamic downforce on the vehicle body when the vehicle is in motion; and a mechanism arranged between the first splitter portion and the second splitter portion and configured to vary a position of the second splitter portion relative to the first splitter portion to thereby control a movement of the oncoming ambient airflow relative to the vehicle body and vary a magnitude of the aerodynamic downforce;

wherein:

the first splitter portion generates a first portion of the aerodynamic downforce;

the second splitter portion is mounted adjacent to the first splitter portion in the oncoming ambient airflow to generate a second portion of the aerodynamic downforce; and the mechanism is configured to selectively shift the second splitter portion relative to the first splitter portion in a direction transverse to the longitudinal vehicle body axis and thereby separate the second splitter portion from the first splitter portion and adjust the magnitude of the aerodynamic downforce generated by the splitter on the vehicle body.

11. The motor vehicle according to claim 10, further comprising an electronic controller configured to regulate the mechanism.

12. The motor vehicle according to claim 11, further comprising a road wheel, wherein the splitter system additionally includes a first sensor configured to detect a rotating speed of the road wheel and communicate the detected rotating speed of the road wheel to the controller.

13. The motor vehicle according to claim 12, wherein the splitter system additionally includes a second sensor configured to detect a yaw rate of the vehicle body and communicate the detected yaw rate to the controller.

14. The motor vehicle according to claim 13, wherein the splitter system additionally includes a third sensor configured to detect a velocity of ambient airflow relative to the vehicle and communicate the detected velocity of the ambient airflow to the controller.

15. The motor vehicle according to claim 14, wherein the second splitter portion includes a second splitter portion axis, and wherein the mechanism is configured to rotate the second splitter portion relative to the first splitter portion, to thereby selectively vary an angle of the second splitter portion axis relative to the longitudinal body axis to thereby adjust the magnitude of the aerodynamic downforce on the vehicle body.

16. The motor vehicle according to claim 15, wherein the controller is configured to vary the angle of the second splitter portion axis relative to the longitudinal body axis via the mechanism during vehicle cornering in response to the detected yaw rate and at least one of the detected rotating speed of the road wheel and velocity of the ambient airflow to thereby adjust the magnitude of the aerodynamic downforce on the vehicle body and control the detected yaw rate.

17. The motor vehicle according to claim 10, wherein the second splitter portion is mounted to the first splitter portion, and the mechanism includes at least one stanchion moveably connecting the second splitter portion to the first splitter portion.

18. The motor vehicle according to claim 10, wherein the mechanism includes at least one of a linear actuator and an electric motor.

* * * * *